(12) United States Patent
Borovinov

(10) Patent No.: US 10,415,837 B2
(45) Date of Patent: Sep. 17, 2019

(54) SYSTEMS AND METHODS FOR PREVENTING FREEZE DAMAGE TO HEATING SYSTEM PIPES

(71) Applicant: Valentin Borovinov, Little Neck, NY (US)

(72) Inventor: Valentin Borovinov, Little Neck, NY (US)

(*) Notice: Subject to any disclaimer, the term of this patent is extended or adjusted under 35 U.S.C. 154(b) by 0 days.

(21) Appl. No.: 15/791,012

(22) Filed: Oct. 23, 2017

(65) Prior Publication Data

US 2018/0266702 A1    Sep. 20, 2018

Related U.S. Application Data

(63) Continuation of application No. 13/072,958, filed on Mar. 28, 2011, now Pat. No. 9,797,606.

(60) Provisional application No. 61/379,654, filed on Sep. 2, 2010, provisional application No. 61/318,089, filed on Mar. 26, 2010.

(51) Int. Cl.
 *F24D 19/10* (2006.01)

(52) U.S. Cl.
 CPC ..... *F24D 19/1012* (2013.01); *F24D 19/1015* (2013.01); *F24D 2220/042* (2013.01); *Y02B 30/745* (2013.01)

(58) Field of Classification Search
 CPC ......... F24D 19/1012; F24D 2220/0042; F24D 19/1015; Y02B 30/745
 See application file for complete search history.

(56) References Cited

U.S. PATENT DOCUMENTS

| | | | |
|---|---|---|---|
| 1,780,379 | A | 11/1930 | Durdin |
| 3,103,946 | A | 9/1963 | Troxell |
| 4,457,326 | A | 7/1984 | Donnelly |
| 4,460,006 | A | 7/1984 | Kolze |
| 4,635,668 | A | 1/1987 | Netter |
| 4,657,038 | A | 4/1987 | Lyons |
| 4,848,389 | A | 7/1989 | Pirkle |
| 4,967,780 | A | 11/1990 | Minami |
| 5,240,179 | A | 8/1993 | Drinkwater |
| 5,318,059 | A | 6/1994 | Lyons |
| 5,573,180 | A | 11/1996 | Werbowsky |
| 5,592,989 | A | 1/1997 | Lynn et al. |
| 6,021,798 | A | 2/2000 | Martin |
| 6,622,930 | B2 | 9/2003 | Laing et al. |
| 7,532,982 | B2 | 5/2009 | Inoue |
| 7,954,506 | B2 | 6/2011 | Swan |

(Continued)

OTHER PUBLICATIONS

Examiner's Report dated Mar. 11, 2015 in Canadian Patent Application No. 2,735,457.

(Continued)

*Primary Examiner* — Kevin L Lee
(74) *Attorney, Agent, or Firm* — Byrne Poh LLP

(57) ABSTRACT

Systems and methods for preventing freeze damage to heating system pipes are provided. In some embodiments, systems for preventing freeze damage to heating system pipes that carry a liquid used to heat a heated space and that are exposed to freezing temperatures outside of the heated space are provided, the systems comprising: a hardware controller that causes the liquid to be circulated through the heating system pipes irrespective of the air temperature in the heated space.

6 Claims, 4 Drawing Sheets

(56) References Cited

U.S. PATENT DOCUMENTS

| | | | |
|---|---|---|---|
| 8,833,384 B2* | 9/2014 | Burt | F24F 11/83 137/80 |
| 2004/0069346 A1 | 4/2004 | Adrian | |
| 2004/0240511 A1 | 5/2004 | Yin et al. | |
| 2006/0016902 A1 | 1/2006 | Restivo et al. | |
| 2008/0265046 A1 | 10/2008 | Grimes | |
| 2010/0025489 A1 | 2/2010 | Sambrook | |
| 2014/0222366 A1* | 8/2014 | Calder et al. | F24D 19/1081 702/130 |
| 2016/0187894 A1* | 6/2016 | Malky | F24D 3/02 700/276 |

OTHER PUBLICATIONS

Notice of Allowance dated Jun. 20, 2017 in U.S. Appl. No. 13/072,958.
Office Action dated Jan. 3, 2017 in U.S. Appl. No. 13/072,958.
Office Action dated Jan. 23, 2017 in CA Application No. 2,735,457.
Office Action dated Jun. 20, 2014 in U.S. Appl. No. 13/072,958.
Office Action dated Jul. 6, 2018 in CA Patent Application No. 2,735,457.
Office Action dated Sep. 11, 2015 in U.S. Appl. No. 13/072,958.
Office Action dated Nov. 29, 2013 in U.S. Appl. No. 13/072,958.
Office Action dated Dec. 18, 2014 in U.S. Appl. No. 13/072,958.
Office Action dated Apr. 21, 2016 in U.S. Appl. No. 13/072,958.
U.S. Appl. No. 61/318,089, filed Mar. 26, 2010.
U.S. Appl. No. 61/379,654, filed Sep. 2, 2010.

* cited by examiner

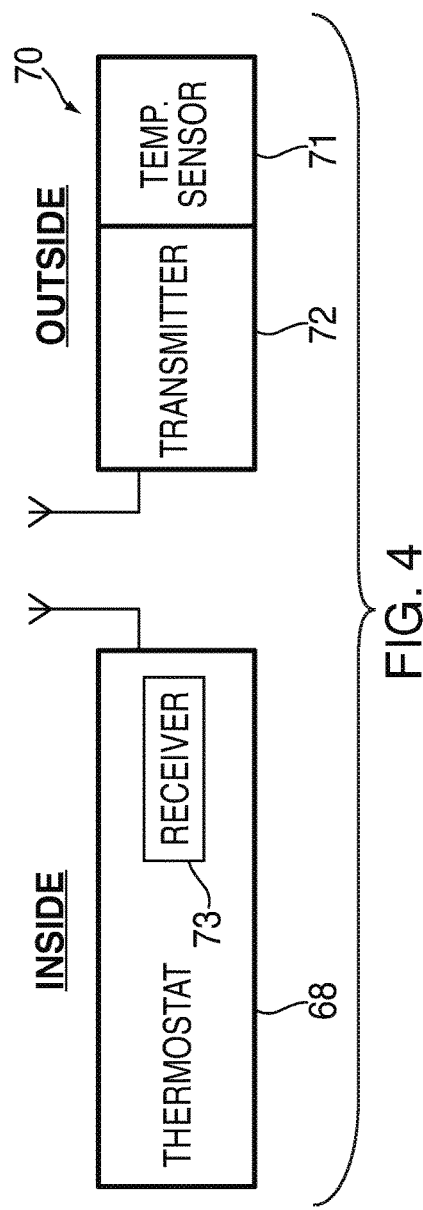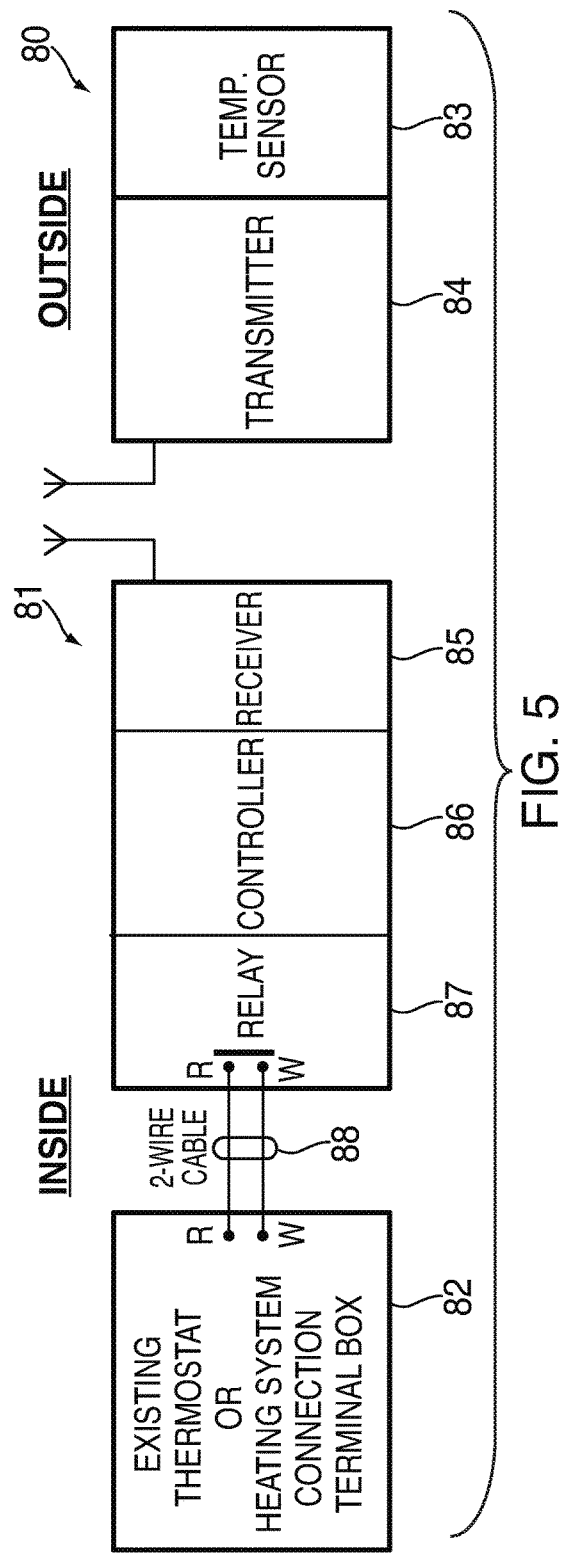

SYSTEMS AND METHODS FOR PREVENTING FREEZE DAMAGE TO HEATING SYSTEM PIPES

CROSS-REFERENCE TO RELATED APPLICATIONS

This application is a continuation of U.S. patent application Ser. No. 13/072,958, filed Mar. 28, 2011, now U.S. Pat. No. 9,797,606, which claims the benefit of U.S. Provisional Patent Application No. 61/318,089, filed Mar. 26, 2010, and U.S. Provisional Patent Application No. 61/379,654, filed Sep. 2, 2010, each of which is hereby incorporated by reference herein in its entirety.

TECHNICAL FIELD

The disclosed subject matter relates to systems and methods for preventing freeze damage to heating system pipes.

BACKGROUND

In many instances involving hot water heating systems, sections of the systems, especially those located far from the boiler, may be exposed to freezing conditions because the thermostat which controls the water circulation is installed in a well-insulated area while the vulnerable sections are not. Typical examples include a renovated dwelling with new thermal insulation where heating conduits have been left between the insulation layer and the outside walls, and/or heating conduits running along door and window frames.

Similarly, in dwellings that are not occupied for long periods during the cold season, where draining a heating system or using glycol is not practicable and maintaining the place warm to prevent conduit freezing does not justify increased fuel expenses and air pollution, for example, sections of the heating system can freeze.

Freezing of one or more portions of a heating system can result in pipe cracks and pipe joint failures, which can lead to water damage and significant expense.

A variety of methods have been employed to prevent pipe-freeze damage from happening. One such method is to wrap electric heating wire around the pipe. The wire conducts current and heats-up when the pipe temperature gets near the freezing point. Disadvantages of this method include installation difficulties and electrical energy consumption. Other methods require installation of special valves and/or other mechanical plumbing devices. Disadvantages of these alternatives are the cost of the additional devices and required installation.

SUMMARY

Systems and methods for preventing freeze damage to heating system pipes are provided. In some embodiments, systems for preventing freeze damage to heating system pipes that carry a liquid used to heat a heated space and that are exposed to freezing temperatures outside of the heated space are provided, the systems comprising: a hardware controller that causes the liquid to be circulated through the heating system pipes irrespective of the air temperature in the heated space.

In some embodiments, methods for preventing freeze damage to heating system pipes that carry a liquid used to heat a heated space and that are exposed to freezing temperatures outside of the heated space are provided, the methods comprising: determining, using a hardware controller, when the liquid in the heating system pipes may be subject to freezing irrespective of the air temperature in the heated space; and causing, using the hardware controller, the liquid to be circulated through the heating system pipes when the liquid in the pipes is determined to be potentially subject to freezing.

BRIEF DESCRIPTION OF THE DRAWINGS

FIG. 4 is a schematic of a remote temperature sensor communicating with a thermostat in accordance with some embodiments.

FIG. 5 is a schematic of a remote temperature sensor communicating with a wireless adapter in accordance with some embodiments.

DETAILED DESCRIPTION

Figure 1:
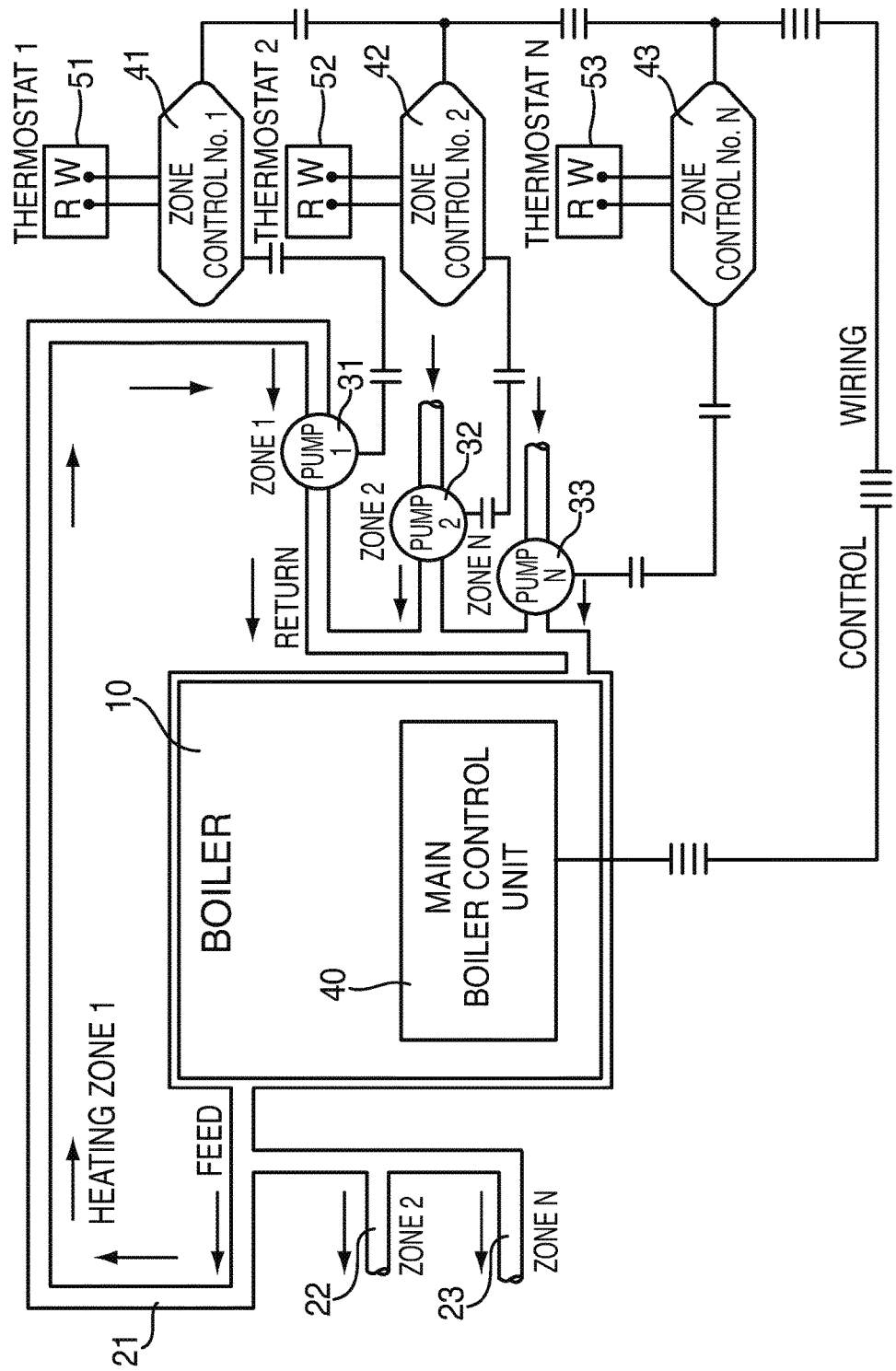
FIG. 1 is a schematic of a common heating system in the prior art.

Systems and methods for preventing freeze damage to heating system pipes are provided.

In accordance with some embodiments, portions of a heating system can be kept from freezing by periodically overriding thermostat settings for the system so that hot water circulates through the controlled system on certain pre-programmed time intervals irrespective of a thermostat indicating that a corresponding space is adequately heated. In this way, pipes that are part of the heating system, but outside the space monitored by the thermostat, can be periodically heated by circulating hot water in the heating system.

In some embodiments, this technique can be easily installed in existing hot water heating systems by changing the thermostat on the wall. For many people, this can be a do-it-yourself project.

The amount of time during which the thermostat is overridden can be selected on any suitable basis and have any suitable values. For example, in some embodiments, the amount of time during which the thermostat is overridden can be based on the outside temperature, the temperature in the space where the to-be-protected pipes are, etc.

In some embodiments, for example, five minutes of moving warm water every hour can be sufficient to keep pipes in an average size single family dwelling from freezing. As another example, override starting times and duration times can be as set forth in the following Table I. These times can be based on typical daily winter temperatures (with coldest point before sunrise and warmest point at sunset), location (which affects ambient temperature and sunlight heating), date, and/or any other suitable criteria.

TABLE I

| Astronomical Time | | Duration of circulation | Time "on" | Time "off" |
|---|---|---|---|---|
| AM | 12 | 8 min | 12:00 | 12:08 |
| | 1 | 9 min | 1:00 | 1:09 |
| | 2 | 10 min | 2:00 | 2:10 |
| | 3 | 11 min | 3:00 | 3:11 |
| | 4 | 12 min | 4:00 | 4:12 |
| | 5 | 13 min | 5:00 | 5:13 |
| Sunrise | 6 | 12 min | 6:00 | 6:12 |

TABLE I-continued

| Astronomical Time | | Duration of circulation | Time "on" | Time "off" |
|---|---|---|---|---|
| | 7 | 11 min | 7:00 | 7:11 |
| | 8 | 10 min | 8:00 | 8:10 |
| | 9 | 9 min | 9:00 | 9:09 |
| | 10 | 8 min | 10:00 | 10:08 |
| | 11 | 7 min | 11:00 | 11:07 |
| PM | 12 | 6 min | 12:00 | 12:06 |
| | 1 | 5 min | 1:00 | 1:05 |
| | 2 | 4 min | 2:00 | 2:04 |
| | 3 | 3 min | 3:00 | 3:03 |
| | 4 | 2 min | 4:00 | 4:02 |
| Sunset | 5 | 1 min | 5:00 | 5:01 |
| | 6 | 2 min | 6:00 | 6:02 |
| | 7 | 3 min | 7:00 | 7:03 |
| | 8 | 4 min | 8:00 | 8:04 |
| | 9 | 5 min | 9:00 | 9:05 |
| | 10 | 6 min | 10:00 | 10:06 |
| | 11 | 7 min | 11:00 | 11:07 |

In some embodiments, as another example, the amount of time in each hour (or any other suitable period of time) during which hot water is circulated can be as shown in the following Table II.

TABLE II

| Temperature (Fahrenheit) | Time "On" |
|---|---|
| 22 | 1 min |
| 21 | 1.5 min |
| 20 | 2 min |
| 19 | 2.5 min |
| 18 | 3 min |
| 17 | 3.5 min |
| 16 | 4 min |
| 15 | 4.5 min |
| 14 | 5 min |
| 13 | 5.5 min |
| 12 | 6 min |
| 11 | 6.5 min |
| 10 | 7 min |
| 9 | 7.5 min |
| 8 | 8 min |
| 7 | 8.5 min |
| 6 | 9 min |
| 5 | 9.5 min |
| 4 | 10 min |
| 3 | 10.5 min |
| 2 | 11 min |
| 1 | 11.5 min |
| 0 | 12 min |
| -1 | 12.5 min |
| -2 | 13 min |
| -3 | 13.5 min |
| -4 | 14 min |
| -5 | 14.5 min |
| -6 | 15 min |
| -7 | 15.5 min |
| -8 | 16 min |
| -9 | 16.5 min |
| -10 | 17 min |
| Can be continued or shorted depending on geographical region | |

As can be seen in Table II, based on the outside temperature (e.g., 8 degrees Fahrenheit), water can be circulated for eight minutes per hour. The actual cycle times used can be modified to take into account insulation amounts and/or effectiveness, solar heating, etc.

In some embodiments, based on thermostat temperature settings and the duration of the "on" cycles, one or more of the above schedules can be modified (e.g., ±50% or any other suitable change in value). The program can then be adjusted so that the indoor temperature does not rise above a thermostat set point. However, in some instances, like when there is extremely good insulation of a thermostat location or too low of a thermostat setting, raising controlled temperature above a customer set point may be necessary in order to maintain protection from pipe freezing.

If manual control of the freeze-preventing feature is desired, the user may be able to choose between, three (for example, or any other suitable number) levels of protection:
Level 1—"Regular" (as shown above);
Level 2—"Increased" (as shown plus one minute); and
Level 3—"High" (as shown plus two or three minutes).

Or, the user can choose to disable freezing protection so that the system will function as a conventional programmable thermostat.

In some embodiments and instances, the effect of increasing controlled temperature due to additional timer-forced "on" cycles may offset the duration of thermostat-called "on" cycles, reducing the total impact of the timer-forced cycles on overall energy consumption and environmental impact.

Figure 2:
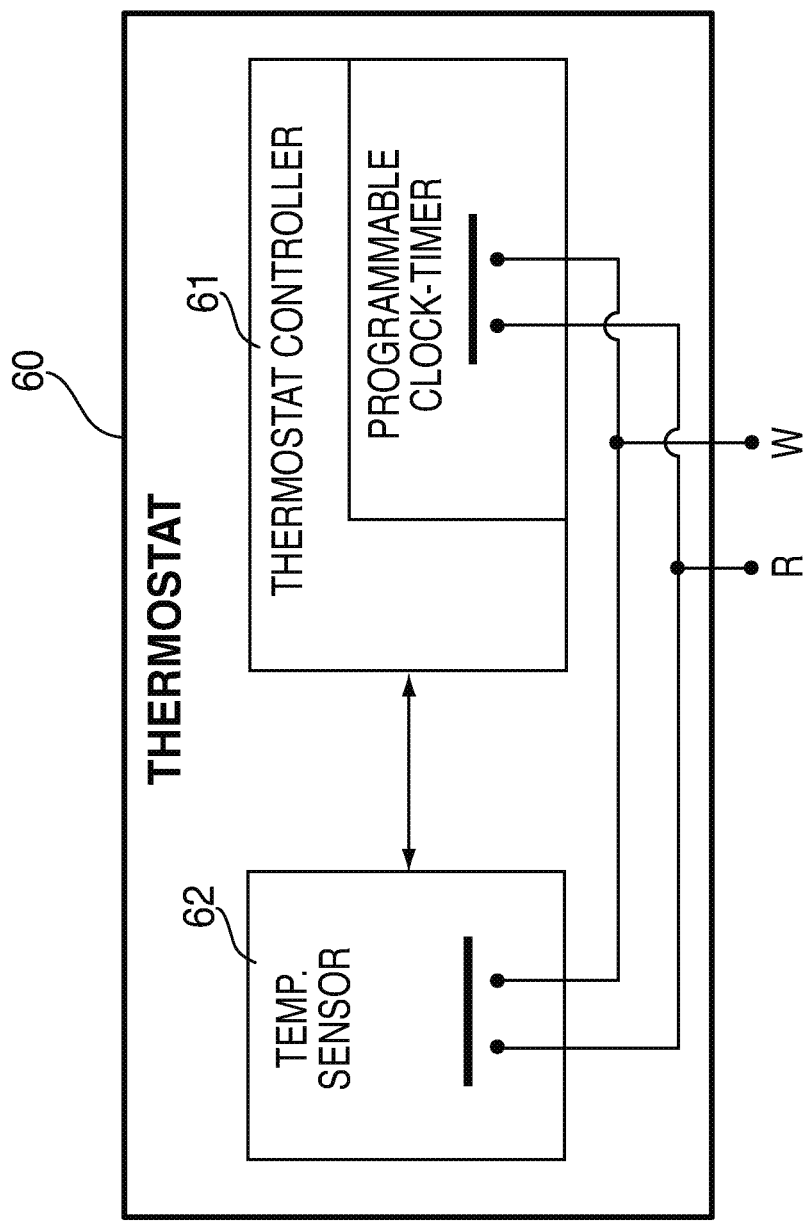
FIG. 2 is a schematic of a thermostat for controlling a heating system in accordance with some embodiments.
Figure 3:
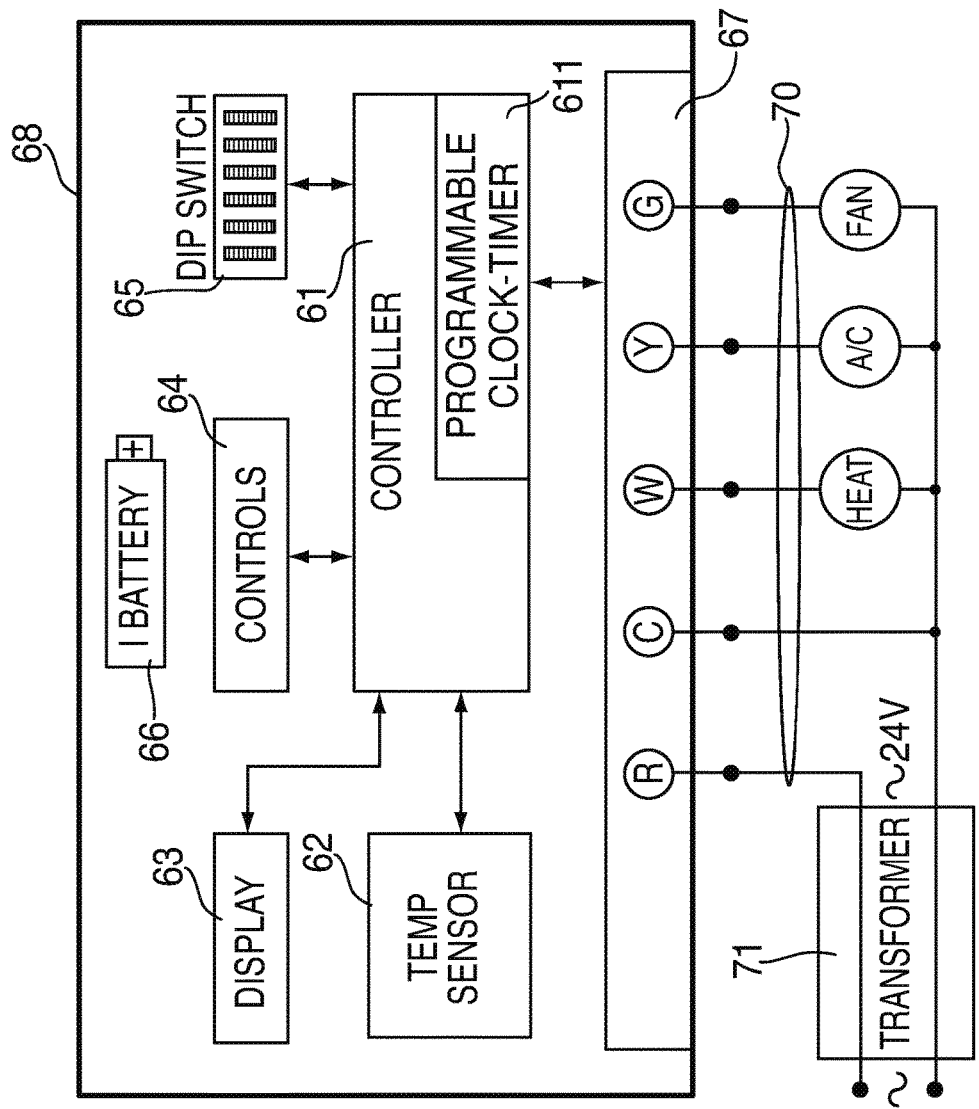
FIG. 3 is a schematic of another thermostat for controlling a heating system in accordance with some embodiments.

Turning to FIGS. 1-3, FIG. 1 shows a drawing of a system in which a liquid is used to transfer heat energy to individual zones in accordance with some embodiments. FIG. 2 is a simplified schematic of a thermostat with a "heating pipe freezing prevention feature" in accordance with some embodiments. FIG. 3 is a general schematic view of a thermostat in accordance with some embodiments.

More particularly, FIG. 1 shows an arrangement of a heating system in which liquid is used to transfer heat energy to multiple zones. A single zone system could be equally served by the invention. As illustrated, a boiler 10 is used to heat water or any suitable liquid. Pump 31 provides a method to move the liquid through the pipes 21 which service zone 1. Pump 32 is used in a similar way to move the liquid through the pipes 22 which service zone 2. Pump 33 provides a method to move the liquid through pipes 23 which service yet another zone N (where N can be any number of zones). This system of pumps and pipes can be extended to service as many zones as required.

The system in FIG. 1 can be controlled by a central main control unit 40 and multiple slave controls 41, 42, and 43 corresponding to the number of zones and pumps. Each zone control can be driven by a thermostat 51, 52, or 53 located within a heated area that a particular zone services. Multiple variations of the described system exist including but not limited to the use of zone solenoid type valves instead of multiple pumps.

FIG. 2 shows an example of possible interconnections between a temperature sensor 62 and a thermostat controller 61 in respect to the thermostat output heating terminals R and W of a thermostat 60 that can be used in place of thermostats 51, 52, and/or 53 of FIG. 1. As shown, the R and W terminals can be coupled together via the switch (which can be mechanical, solid state, etc.) in either temperature sensor 62 or thermostat controller 61. When these terminals are coupled together, the heating system can be caused to turn on.

FIG. 3 is a block diagram of an example of a thermostat 68 in accordance with some embodiments. As shown, contact strip 67 can include a number of terminal connectors, here labeled with the letter identifiers for various conductors in a multi-conductor thermostat cable 70, as known in the art, including an R (thermostat power conductor) terminal and a W (heat conductor) terminal. In the illustrated embodiment, the terminal block also has an air conditioning terminal Y, fan terminal G and optional common terminal C, although these can be omitted in some embodiments.

Thermostat controller 61 can include any suitable hardware controller for controlling the thermostat. In some embodiments, the thermostat controller can include a hardware controller such as a microprocessor, a hardware processor, a digital processing device, a microcontroller, dedicated logic (e.g., in discrete logic, a programmable gate array, etc.), timer circuitry, and/or any other suitable control or processing components. The thermostat controller can also include memory (e.g., random access memory, read only memory, flash memory, etc.). Any suitable software, settings, data (e.g., in look-up tables, etc.), etc. can be stored in such memory. This software, while being executed in the controller, can implement a clock or timer 611 for controlling the above-described "pipe freezing protection feature." Alternatively, in some embodiments, separate hardware can be included in thermostats 68 for implementing a clock or timer 611.

The thermostat can also include a display 63 and any associated drive circuitry needed to couple it to thermostat controller 61.

The thermostat can further include a temperature sensor 62. Temperature sensor 62 (which can be any suitable type of temperature sensor, such as a mechanical or solid state temperature sensor, thermostat, sender, etc., and can include a thermistor, thermocouple, etc.) can be used to supply a room (ambient) temperature to the thermostat controller. In some embodiments, the temperature sensor can be remotely located from the thermostat.

Controls 64 can provide keys used to set-up and program the thermostat controller. Similarly, DIP (dual inline package) switches/jumpers 65 can be used to semi-permanently set certain thermostat configurations and may employ either wire jumpers plugged into the board or mini switches. A battery 66 can provide DC power for normal thermostat operation and memory loss protection.

A step-down transformer 71 can be used to supply 24V (nominal) AC power to the thermostat R terminal, enabling it to control various connected appliances.

In some embodiments, other sensors can be coupled (either via wire or wirelessly) to the thermostat controller to detect outside temperature, outside sunlight (e.g., sunrise, sunset, amount of sunlight hitting a structure, etc.), time, and/or any other suitable conditions.

For example, as shown in FIG. 4, a temperature sensing element 70 can be coupled wirelessly to a thermostat, such as thermostat 68. As illustrated, this temperature sensing element can detect the outside temperature using a temperature sensor 71 and transmit that temperature measurement via a transmitter 72 to the thermostat. The thermostat can then receive that measurement via a receiver 73 and provide it to a controller in the thermostat.

As another example, as shown in FIG. 5, a temperature sensing element 80 can be coupled wirelessly to a wireless adaptor 81 that is coupled to an existing thermostat or heating system connection terminal box 82. As illustrated, this temperature sensing element can detect the outside temperature using a temperature sensor 83 and transmit that temperature measurement via a transmitter 84 to wireless adaptor 81. The wireless adapter can then receive that measurement via a receiver 85 and provide it to a controller 86 (which can be any suitable control mechanism such as those described above), which controls a relay 87 coupled to the R and W terminals of a separate, existing thermostat or heating system connection terminal box 82 via a two-wire cable 88.

In the configurations illustrated in FIGS. 4 and 5, water circulation can be controlled based on the outside temperature for durations such as those illustrated in Table II and described in connection therewith. In some embodiments, the outdoor temperature sensing element and transmitter can be operated using battery power and controlled to reduce battery power by periodically measuring temperature and transmitting that measurement rather than doing so continuously. So, for example, the temperature sensing element may be configured to measure temperature once per hour and transmit that temperature after each measurement, and then power down until the next hour. Any suitable interval for such measurements and transmissions can be used.

Also, in some embodiments, a data source provide via any suitable interface (e.g., a network connection (such as to the Internet), a radio connection, etc.) can be used to determine outside temperature, outside sunlight (e.g., sunrise, sunset, amount of sunlight hitting a structure, etc.), time, and/or any other suitable conditions.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for preventing freeze damage to heating system pipes that carry a liquid used to heat a heated space and that are exposed to freezing temperatures outside of the heated space, comprising:
   a hardware controller configured to:
      receive an outside temperature measurement;
      determine a first specific duration for which the liquid is to be circulated through the heating system pipes based on a first value of the outside temperature measurement;
      cause the liquid to be circulated through the heating system pipes for the first specific duration during a first time period;
      determine a second specific duration for which the liquid is to be circulated through the heating system pipes based on a second value of the outside temperature measurement, wherein the second value is different from the first value and wherein the second specific duration is different from the first specific duration; and cause the liquid to be circulated through the heating system pipes for the second specific duration during a second time period that is different than the first time period.

2. The system of claim 1, further comprising a wireless receiver that receives a temperature measurement from a remote temperature sensor and that provides that temperature measurement to the hardware controller as the outside temperature measurement.

3. The system of claim 1, further comprising an interface that receives a temperature measurement from a remote temperature sensor via a computer network and that provides that temperature measurement to the hardware controller as the outside temperature measurement.

4. A method for preventing freeze damage to heating system pipes that carry a liquid used to heat a heated space and that are exposed to freezing temperatures outside of the heated space, comprising:

receiving, using a hardware controller, an outside temperature measurement;

determining, using the hardware controller, a first specific duration for which the liquid is to be circulated through the heating system pipes based on a first value of the outside temperature measurement;

causing, using the hardware controller, the liquid to be circulated through the heating system pipes for the first specific duration a first time period;

determining, using the hardware controller, a second specific duration for which the liquid is to be circulated through the heating system pipes based on a second value of the outside temperature measurement, wherein the second value is different from the first value and wherein the second specific duration is different from the first specific duration; and causing, using the hardware controller, the liquid to be circulated through the heating system pipes for the second specific duration during a second time period that is different than the first time period.

5. The method of claim 4, further comprising receiving a temperature measurement from a remote temperature sensor and using that temperature measurement as the outside temperature measurement.

6. The method of claim 4, further comprising receiving a temperature measurement from a remote temperature sensor via a computer network and using that that temperature measurement as the outside temperature measurement.

* * * * *